UNITED STATES PATENT OFFICE.

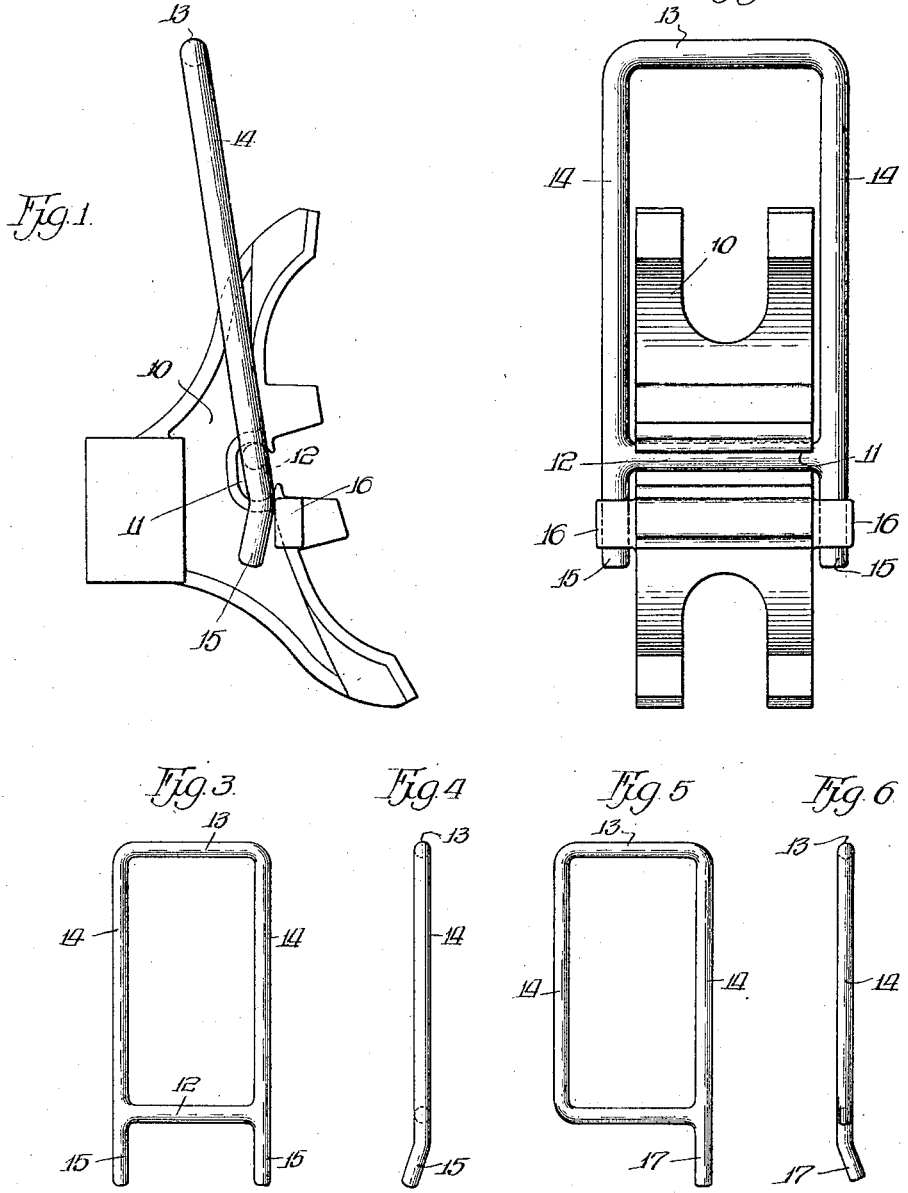

LOREN L. WHITNEY, OF HAMMOND, INDIANA, ASSIGNOR TO AMERICAN STEEL FOUNDRIES, OF CHICAGO, ILLINOIS, A CORPORATION OF NEW JERSEY.

FORGED-BRAKE-HANGER ARRANGEMENT.

1,318,121.  Specification of Letters Patent.  Patented Oct. 7, 1919.

Application filed October 4, 1918. Serial No. 256,806.

*To all whom it may concern:*

Be it known that I, LOREN L. WHITNEY, a citizen of the United States, residing at Hammond, in the county of Lake and State of Indiana, have invented certain new and useful Improvements in Forged - Brake-Hanger Arrangements, of which the following is a specification.

This invention relates to brake mechanism and more particularly to a forged brake hanger and its operative connection to an associated brake head.

The object of the invention is to simplify and improve means whereby a brake hanger and brake head to which it is connected cannot be accidentally disconnected even when the usual locking means is ineffective.

Another object is to provide another safety connection between a brake hanger and head adapted to meet the various requirements for successful commercial use.

These and other objects are accomplished by means of the arrangement disclosed on the accompanying sheet of drawings, in which—

Figure 1 is a side elevation of a brake head and hanger embodying my invention;

Fig. 2 is a front elevation of the same;

Fig. 3 is a front elevation, and Fig. 4 a side elevation of the hanger; and,

Fig. 5 is a front elevation, and Fig. 6 a side elevation of a modified form of hanger.

Referring particularly to the figures of the drawing, it will be noted that I have shown a brake head 10 which is provided with a centrally arranged transverse opening 11 for the reception of a cross pivotal member 12 of a brake hanger 13. The brake head is provided with the usual parts for the reception of a brake shoe (not shown) for retaining or pocketing the hanger within the brake head. In some instances this is the sole means for preventing the brake head and hanger from being accidentally disconnected. Under such conditions when the brake shoe becomes worn to the point of breaking, or for any other reason is removed from the brake head, the hanger and brake head are apt to be disconnected, permitting the brake head and beam to fall to the track, sometimes resulting in wrecks.

To make the connection between the brake hanger and head more safe, I have provided the vertical sides 14 of the hanger with depending end portions 15 which extend rearwardly with respect to the main portions 14 and which are adapted to engage laterally extending projections 16 on the brake head 10 at a point adjacent the front portion of the head which receives the brake shoe. It will be noted that the coöperating safety locking members 15 and 16 lie below the pivotal connection between the brake head and hanger whereby it is impossible for the brake head to rotate in a clockwise direction, as shown in Fig. 1 of the drawings, for freeing itself from the hanger, the members 15 and 16 coming into engagement with each other under such circumstances to prevent such movement. Any other relative movement of the brake head with respect to the brake hanger is limited as a result of the relative positions of the brake head and the associated truck wheels.

The brake hanger is applied to the head by having the hanger in a horizontal position whereby the members 15 will pass over the projection 16, it being understood, of course, that at the time of application, the brake beam is not in its normal position on the truck. After the brake hanger is applied, the brake shoe may be connected in its proper place on the brake head.

In Figs. 1 to 4, inclusive, a brake hanger is shown having two depending projections 15 associated with two laterally extending projections 16 on the brake head. In Figs. 5 and 6 I have shown a brake hanger wherein but one depending projection 17 is provided for engaging a single associated projection on the brake head. In both cases the depending brake hanger members are bent rearwardly to permit a certain amount of free movement between the brake hanger and head.

It is my intention to cover all modifications of the invention falling within the spirit and scope of the following claims:

I claim:

1. In brake mechanism, the combination of a brake head, and a brake hanger pivotally connected thereto, said head and hanger having coöperating locking means located below the pivotal connection and at the outer sides of the brake head for preventing said head and hanger from being accidentally disconnected.

2. In brake mechanism, the combination of a brake head, and a brake hanger pivotally connected thereto, said head and hanger having coöperating means for engagement below the pivotal connection and at the outer sides of the brake head for preventing said head and hanger from being accidentally disconnected.

3. In brake mechanism, the combination of a brake head having an opening and a lateral projection extending beyond an outer side of the head, and a brake hanger, one portion of which is received by said opening to form a pivotal connection between the head and hanger, said hanger having a projection extending below the pivotal connection for engaging the projection on the head for preventing said head and hanger from being accidentally disconnected.

4. In brake mechanism, the combination of a brake head, and a hanger pivotally connected thereto, the head having a laterally extending projection and the hanger a deflected portion for engaging said projection for preventing said head and hanger from being accidentally disconnected.

5. In brake mechanism, the combination of a brake head having an opening normally closed by a brake shoe, and a brake hanger having a portion received by said opening to form a pivotal connection between the hanger and head, said hanger and head having coöperating portions located below the pivotal connection between the hanger and the head which permit a limited amount of relative movement between said parts but prevent the same from being accidentally disconnected.

Signed at Hammond, Indiana, this 30th day of Sept., 1918.

LOREN L. WHITNEY.